United States Patent [19]

Lontz

[11] 4,178,096
[45] Dec. 11, 1979

[54] HIGH FIDELITY COLOR PRINTS

[75] Inventor: John F. Lontz, Wilmington, Del.

[73] Assignee: John F. Lontz Associates, Inc., Wilmington, Del.

[21] Appl. No.: 887,436

[22] Filed: Apr. 10, 1978

[51] Int. Cl.$^2$ .................. G03B 27/32; G03B 27/52
[52] U.S. Cl. .................................... 355/32; 355/77
[58] Field of Search .................. 355/32, 33, 74, 77

[56] References Cited

U.S. PATENT DOCUMENTS

| | | | |
|---|---|---|---|
| 2,050,552 | 8/1936 | Baker | 355/32 X |
| 2,084,353 | 6/1937 | McNett | 355/32 X |
| 2,927,857 | 3/1960 | Pohl | 355/32 X |
| 3,619,051 | 11/1971 | Wright | 355/32 |
| 3,967,897 | 7/1976 | Rogers | 355/32 |

*Primary Examiner*—Donald A. Griffin

[57] ABSTRACT

This invention relates to finished photographic reproduction and imaging system by which the photographic color matching to that of the object photographed is accomplished by means of an imposed, permanently adherent integral overlay of transparent film serving to adjust, by addition or subtraction of the color deficiencies or excesses with respect to chroma, value and hue so as to more nearly and truly match or approximate the color or colors of the object from which the photograph was made. The color correcting or adjusting overlay of the transparent colored films comprise a broad range of chromal intensities of the nominally red, yellow, blue and green and other intermediate spectral hues and that of discrete mixtures with several orders of color intensities, which overlay is further provided with a pressure-sensitive adhesive for permanent and smooth affixture to the photographic emulsion of the print which is to be provided with the necessary correction or adjustment. The invention involves the use of a novel overlay laminating film having high transparency, mechanical strength and tear resistance, dyeable to a varied range of color intensitities and provided with a thin layer of pressure-sensitive adhesive. The novel color correcting adherent laminating overlay is applied to the color deficient or exaggerated print wherein the color correction, augmentation or appropriate adjustment is predetermined from already measured intensities of the selected spectral standards of red, green, yellow and blue using digital color difference comparator that provides numerical, quantitized reflections of the selected color reference standards to which the color correcting overlay laminates are made to match for a high fidelity color print.

4 Claims, 6 Drawing Figures

HIGH FIDELITY COLOR PRINTS

The object of this invention is to provide high quality color photographs, prints, and imaging systems consisting of color correcting laminating overlays emplaced and bonded over color deficient prints by means of thin color films selected from predetermined range of spectral colors with a broad range of intensities serving to add or subtract selected color features to the color deficient print so as to replicate the natural colors of the photographed or imaged object with measured and assigned, specific color intensities.

A still further object of this invention is to provide a true or high fidelity color photograph or image whereby the resulting color deficiencies in the processed print are corrected and adjusted by reference to color measurements using spectral ranges in terms of nominal red, yellow, green, and blue regions of a standard light source, which corrections are gained by additive or substractive colors incorporated into the thin laminating polymeric film overlays.

A still further object of this invention is to provide a range of color additive and/or color substractive overlay films for laminations over color prints having a layer of adhesive serving to produce permanently bonded composite with the print for the color corrected finished print.

A still further object of this invention is to provide means for emplacing the bonded color correcting laminate overlay onto the color deficient print so as to be made integral thereto by firm, compact lamination.

A still further object of this invention is to provide a means for accomplishing the color correcting and adjusting laminating process over the color deficient print or image by a single step application of the laminating overlay thermally bonded under pressure to produce a finished, acceptable color rendition of the photographed or imaged object as an article of commerce.

Figure 1A:
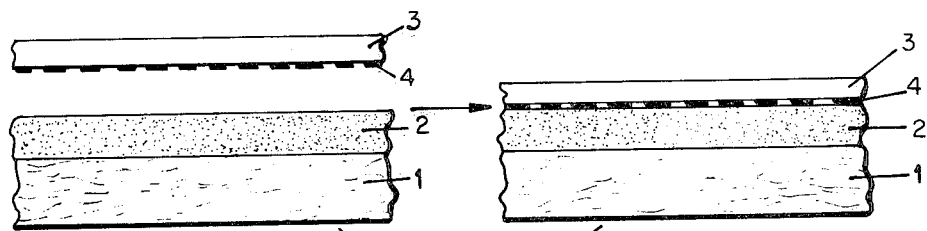
FIG. 1A shows a color print having a color correcting overlay secured thereto.
Figure 1B:
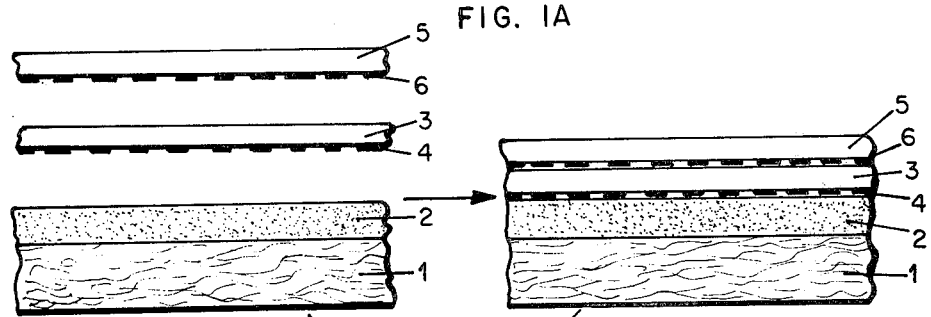
FIG. 1B shows a color print having a plurality of color correcting overlays secured thereto.
Figure 1C:
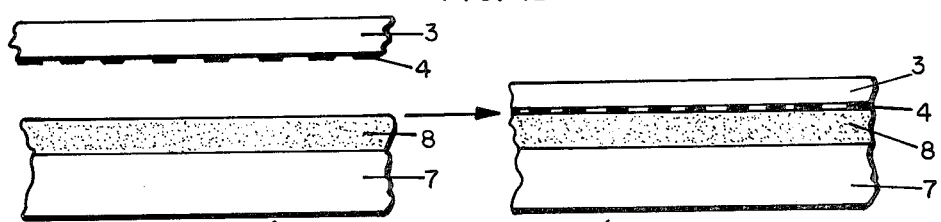
FIG. 1C shows a color transparency having a color cofrecting overlay secured thereto.

Film 4 shows a color transparency of the type shown in FIG. 1C encased in an envelope of polymeric film.

Reproducing high fidelity color by photographic means and attendant processing operations is a complex and extensive involvement of art and technology. The complexity begins with variables of the initially imposed light source on the photograph object and then extends to the variables of the lens optics and their correctness, to the sensitivity and spectral limitations of the film on which the coloration of the natural object is to be registered, followed by the highly complex developing and processing variables that have to be selected and adjusted to attain the desired fidelity of the colors of the original natural object. Thus, from the object being photographed to the ultimate color print or image, the possible deviations from the desired color trueness or naturalness of the print have to be continually monitored, often by trial and error, and usually subject to the visual judgement of the photographer or the printer. Often these deviations emanate from either the exaggeration of one or more of the primary colors reflected from the subject under improper conditions of light, either spectrally or from range of intensity, or by the inadequacy of the photographic film to accept completely the optically imaged object. Thus, in addition to the proper use of the lighting on the object, the true or acceptably true development of each of the primary colors, be it a landscape scene, portrait or whatever, the technology of photographic printing involves placing each of the primary spectral colors and their myriads of combinatives chroma and hues, in a balance as near as possible to that of the original lighted object. Often, when the lighted object has been put in some unfavorable condition, the exaggerations or imbalance of the colors can be corrected often by the well-established practice of correction filters presently in use but only by subjective trial and error judgement using color filters. As best this subjective method is time-consuming, more often than not involving wasting of photographic film and color print papers.

In the art of color photography extensive use is made of supplementary color corrections by means of registered filters to adjust the imbalance or un-naturalness of the developed additive primary colors, red, green and blue, reflected from the photographed object by the use of substractive primary colors namely, cyan, magenta, and yellow, which are used to adjust the amount or intensity of red, green, and blue primary colors reaching the specific color sensitivities emplaced in the emulsion by the manufacturing source and its designated film standards and quality. In effect, a system of interposing the primary substractive filters, is made available with a graded series of intensities of color and gray density, between for instance the imaged negative and the desired print. Often by visual judging of the developed print, experienced technicians can select the interposing subtractive filters in numerous combinations and also with added primary color filters to control one, selected exaggerated primary color and at the same time to intensify another, all by means of two or more filters, commonly available by the manufacturers of color photographic papers and accessories designed to assist in visual color balancing of the print so to attain the desired high fidelity terms of appropriate standards.

In the strict sense of physics, color is measured and defineable by means of reflectance spectrophotometer which measures the fraction of light reflected by an object or sample for every wave length of the visible spectrum. As a measuring and recording instrument, the reflectance spectrophotometer reads the wave length fractions for the total visible range to the human eye from the one extreme of the red, or approximately 700 nm (nanometers) wave length, to the other extreme of the blue, or approximately 400 nm. The instrumentally recorded total visible specturm can thus be applied to any single or multiple color object, sample or substrate, to ascertain and assess differences among them. For instance, samples of a green paint from various sources and from various admixtures can be measured by reflectance spectophotometer to form a graphic plor or profile of the reflectance of each incremental, single wave length from which the green peak, which is in about the middle of the spectrum, can be compared in among the various samples for the most prominent color as well as other subsidiary peaks that may occur anywhere from the one extreme of the blue at 400 nm to the other extreme of the red at 700 nm. Thus, the graphic plot or profile provides an unequivocal characterization of the color spectral characteristics of a sample object with a wide usuale hitherto yet to be appreciated in the esthetics and technology of color reproduction as it provides the unequivocal defining of colored objects particularly made up as most photographs, prints and images, are from many components colors in variations of chroma, hue and value.

The color spectral reflectance in profile in graphic form however are not suitable or generally utilized for color specifications, even though spectrophotometric measurements are required in case of dispute or contested differences. Color specifications generally take into consideration the visual sensibility of the human eye, and then in terms of some numerical or digitalized color-mixture functions, such as is established and recommended by the International Commission on Illumination (ICI) based on normal color vision. Three color mixture functions, designated $\bar{x}$, $\bar{y}$, and $\bar{z}$ span the entire visual range from nominally 700 nm or the red extreme to the 400 nm or the blue extreme assigned by the ICI function, are used to obtain corresponding tristimulas values from spectral measurements on colored objects or samples, designated now as tristimulus values X, Y, and Z. In actual practice these tristimulus values, expressed in numerical or digitalized form are obtained from reflectance spectra (R) by computations as product of the spectra of the light source (E) imposed on the colored object or sample, and in turn multiplied by the ICI assigned color-mixture functions, $\bar{x}$, $\bar{y}$, and $\bar{z}$, to obtain the respective spectral areas which now become identified as the tristimulus X, Y, and Z digitalized or numerical values. Thus, it is simply a matter of computation of the latter from spectral wave length increments for the sample (R) reflectance and that of the imposed light source (E). The digitalized or numerical values can be obtained by simple hand calculation from the two spectra multiplied by the ICI color-mixture functions, or by electronic calculators attached to the spectrophotometer read-out signals.

The tristimulus values thus provides one means of evaluating and assessing quality and characteristics of colored objects with extensions of the values to include other sensible color components, both pure colors as well as composited colors. Quality assessment can therefore be made for specifications of coloring materials and their application to finished materials or objects and also to the control and regulation of color development as has been discovered in this invention, in which the photographic print of subjects can be compared to the actual, living color whereby the two color values can be more reliably judged for approximation, for finishing the printed radiation of the object, in contrast to the visual, often biased judgement, and for devising acceptable ranges of deviation from the living color with designated tolerances. On this basis various digital color difference meters are devised and manufactured for such use in the quality control of colored objects, such as paper, textiles, powders, paints, etc., based on specified ranges of tolerances for each of the tristimulus values or their derived forms to include not only three color ranges but even four or five. The digitalized color difference instrumentation can thus be simplified or modified for computation of these additional derived forms.

Despite the involved computation on which the ICI digitalized tristimulus values or their derived extensions are based, they actually provide a practical and meaningful interpretation. Thus, the luminous reflectance is provided by the second tristimulus value Y. One may regard X as the red, Y as the green as well as the luminous reflectance, and Z as the blue thus encompassing the entire visible color spectral range. Thus, the proportions of these three components become evident. The proportion of red regarded as "x" can be calculated from the expression $x = X/(X+Y+Z)$. Similarly, the proportion of green "y" can be calculated from the expression $y = Y/(X+Y+Z)$, and the proportion of the blue "z" similarly applies. If these tristimulus values for a given sample or object are equal then the color ranges from gray to white obviously depend upon the luminosity. If one of them is significantly greater than that of the others, it represents then the dominant color. Should the dominance from digitalized values be only slight, it is lacking in saturation with low vividness of color as in the case of pastel colors or shades.

For the purposes and the critical requirements of this invention, a modification to the ICI tristimulus system has been devised to extend upon the inadequacy of the three-color chromicity function to include a read-out for the yellow component of the spectral range, as yellow is a highly demanded color in every-day objects of clothing and apparel, foodstuffs, decorative textiles, paints, and protective items, and especially the color of living skin or flesh tones. Hence, for the success of the operation of this invention and for the apparatus and materials involved, the yellow read-out augmentation is mandatory. For the critical requirements of this invention to include yellow in the digitalized measurements of colors, the Hunterlab Digital Color Difference (DCD) Meter and the system it promulgates has been selected and adapted as the systems instrumentation for this invention with the heretofore stated objectives.

The Hunterlab DCD instrumented meter is provided with a source-photodecoder-filter combination designed to simulate the International Commission for Illumination for the obtaining of the tristimulus X, Y, and Z values and the "x" and "y" chromicity coordinates described previously. The Hunterlab DCD commercial meter D25D2A is instrumented to provide the derived L, a, and b scale to give measurements of color in units of approximate uniformity throughout the color object or substrate. Thus, "L" measures brightness and various from 100 for perfect light to 0 (zero) for black, approximately as the human eye would evaluate this scale. The chromicity dimensions, "a" and "b", relate to the nominally sensible four colors suitable and required for this invention, namely, red, green, yellow and blue, instrumented to read as follows:

"a" measures redness when plus (+),
   measures greyness when zero (0),
   measures greeness when minus (−),
when shown on the meter, and
"b" measures yellowness when plus (+),
   measures greyness when zero (0),
   measures blueness when minus (−),
when shown on the meter of the Hunterlab DCD instrument. The relationship between these L, a, b values and the International Commission for Illumination is as follows:

$$L = 10\sqrt{Y} \qquad Y = 0.01 L^2$$

$$a = \frac{17.5 (1.02X - Y)}{\sqrt{Y}} \qquad X = \left[ 0.01 L^2 + \frac{aL}{175} \right] 0.9804$$

$$b = \frac{7.0 (Y - 0.847Z)}{\sqrt{Y}} \qquad Z = \left[ 0.01 L^2 - \frac{bL}{70} \right] 1.181$$

An alternate scale is the Hunter $R_d$, a, b scale where the dimensions "a" and "b" describe the redness-greeness and the yellowness-blueness, respectively, for which conversions to the tristimulus values are made available. The color values as measured with the Hunter D25D2 meter are relative to the absolute value of the perfect white diffuser as measured under the same geometric conditions published in the American Society for Testing and Materials Method E306 and according to the recommendations of the International Commission on Illumination of Jan. 1, 1969. The color values of the Hunterlab meter are repeatable to a standard deviation of 0.2 scale units, when measuring a single specimen on a single instrument. The color values are reproducible to a standard deviation of 0.3 scale units between instruments of the type used in this invention. The color values are accurate to a root mean square deviation of 1.0 scale units, from an accepted reference level. The accepted references for Hunterlab meter are the Illuminant C 1931 2° observer values assigned to Master Reflectance standards, as computed directly from spectrophotometric measurements. This discussion now completes the descriptive features and the explanation of precise and accurate employment in this invention beginning with the initial concept of spectral characteristics as a continuous line profile of the reflectance for each unit of wave length, next the conversion or translation of the spectral profile into a digitalized tristimulus and hence, a three-color measurement system and lastly to an instrumented system to include the four essential and practical colors for the effective operations and teaching of this invention.

To illustrate the suitability of augmenting the three color tristimulus system to appropriate read-out with four principal color renditions, namely, red, green, yellow, and blue, the Hunterlab system was critically tried out with two high quality competing grades of color photography films, both of the same or equivalent ASA rating, in order to ascertain how much discrimmation of the Hunterlab could provide on the reproducibility of a field of contrasting as well as subtle variations in color. In this case, a field of orchids growing in green foliage was taken as the severe test of both the system and of the quality of the two color photographic films. Frequently, the orchids are given an objectionable red hue rather than a pale or light purple which on the color circle is a difficult color composition to attain as the red of the red-blue combination is often overwhelmed by the red in the film and the printing paper. For purposes of appropriate identification in the ensuring discussion and in the tabulation of the digitalized date shown in Table 1, the conventional color film in the trade is designated as Film A, while its competing companion made experimentally to overcome the excessive red sensitivity is designated Film B. A series of color prints was made from photographs of the orchid field at distances of approximately 10 meters, then 3 meters, then 1 meter with exacting application of all exposure and processing conditions to the final print for read-out of the four colors by the instrument. The last-named, close 1-meter print was taken purposely to ascertain the ultimate distinction between the films as well as ascertaining the discriminating sensitivity of the DCD system. Included also in the DCD read-out was the measurements on clippings of the foliage in the form of ordinary green grass and of pale purple, as the human eye sees it, petals of the orchids. Table 1 summarizes the results of L, a, b units along with the corresponding convesion into the tristimulus units.

Table 1

Summary of L, a, b Readings from Prints of Films A and B
Subject: Field of orchids

| Film | | Distance (meters) | L | a | b | Y | X | Z | Remarks |
|---|---|---|---|---|---|---|---|---|---|
| A | Orchid field | 10 | 33.1 | + 1.0 | + 5.5 | 10.7 | 10.8 | 9.5 | Excessive redness |
| B | Orchid field | 10 | 38.4 | + 3.7 | + 4.0 | 14.5 | 15.1 | 14.5 | Acceptable |
| A | Ground foliage | 3 | 35.5 | + 0.4 | + 11.0 | 12.4 | 12.3 | 7.8 | Lacks greenness |
| B | Ground foliage | 3 | 30.0 | − 5.5 | + 10.7 | 8.8 | 7.8 | 4.8 | acceptable |
| A | Orchids | 1 | 51.3 | + 7.5 | + 5.1 | 26.0 | 27.6 | 26.0 | Excessive redness |
| B | Orchids | 1 | 49.7 | + 1.6 | − 1.2 | 24.4 | 24.5 | 29.8 | Acceptable |
| | Grass clippings* | | 58.5 | − 11.1 | + 3.3 | 32.2 | 29.9 | 37.4 | Natural |
| | Orchid petals* | | 62.4 | + 2.0 | − 1.8 | 38.9 | 38.1 | 38.5 | Natural |

*Actual clippings and petals under DCD meter.

In all three cases of photographs and prints made at the indicated distances, namely, for the orchid field with its surrounding green foliage, the closer foliage background, and ultimately on the challenging orchids, the Hunterlab provided not only significant differences with marked levels of discrimination, but also suggested means for correcting the color rendition with laminated overlays, one of the objectives of this invention, that can be selected before-hand to salvage the prints. Thus, the L, a, b system indicates which of the four, rather than just the three tristimulus corrections can be made, and is especially amenable to ascertaining how well the pale or light purple hue of the orchids in the distant and in the close focus can be reproduced even without any corrective laminating overlay of colors, once, as the Table 1 supplementing data indicates, the norms for living grass or foliage and the living petals of the orchid or any other object is ascertained and assigned the Hunterlab L, a, b units at varying degrees of luminosity.

The measured L, a, b readings with the two competing films, as summarized in Table 1, confirm, as would be expected, the color renditions and color balances, such as that of the greens for the foliage with the accompanying purple for the orchids. At the 10 meter distance, the photographic prints averaged out with only the red plus "a" (+a) and the yellow plus "b" (+b) readings, and it could be only a matter of opinion as to which would be accepted as saleable item. In the present invention it is a simple matter to apply a blue overlay laminate to develop a light purple color for the obvious orchid field, and at the same time to include a red-subtracting cyan overlay as the laminate. In the case of the 3 meter distance print, focused only on the green background foliage without the orchids, the conventional Film A failed to reproduce a print with a green minus "a" (−a) value, which was brought into prominance with the Film A rendering a minus "a" (−a) value of −5.3. In this case with the Film A it is possible to impose a green coloration with a laminated overlay prescribed by this invention to give a reasonable satisfactory print. In the case of the 1-meter close-up print, the distinction between the two competing films becomes more prominent inasmuch as the color rendition of the orchid by Film A given an unrealistic dominant red with a plus "a" (+a) reading as indicated in Table 1, along with the prominant yellow plus "b" value (+b), whereas Film B provides the required, nearly balanced or substantially equivalent but lessened amount of red with a plus "a" value (+a) nearly comparable to the equivalent amount of blue with the minus "b" (−b) value. The combination of the red and blue provides the color mixture for the purples as is usually described in the color circle diagram. It will be noted that the plus "a" (+a) to minus "b" (−b) ratio or proportion, with a quotion of 0.75 at the indicated value intensities, approximates that of the actual orchid petals measured in the instrument as indicated in Table 1. It is obvious therefore that no color correction is necessary for the print made from Film B. By the process of this invention, however, the print from Film A, which in large sizes represents a costly article of commerce to be discarded, can be restored to reasonable reproduction of likeness of the print from Film B by simply imposing the corrective color laminate overlay as indicated in the Examples presented in due course of this application.

The discriminating features of digitalizing the color characteristics have been found to apply equally well to the production of high fidelity color prints of portraits in which the intensity of the flesh tones of reds and yellows and especially their ratios within a narrow range, as was discovered in the application of the concept of this invention, are highly critical to attain lifelike, natural appearance. The intrusion of blues and greens into the flesh tones of protraits, for instance, either as the result of excessive high color temperatures of the light source used in making the photograph, or by the blue wash that frequently occurs during the printing operations, to cite typical technical deviations, require color corrections. These color corrections are accomplished by trial and error reprocessing using filter guides that are emplaced on the color deficient photograph to attain what would be visually acceptable as viewed subjectively, and then converted to another print or another negative from which the acceptable coloration would be attained. Often this process is repeated until the acceptable flesh tones are reproduced, but encompassing considerable loss of time and expense of the rejected off-color prints. In this invention the off-color from the first processed print is measured by means of the L, a, b units as a routine inspection for pre-determined limits of specific color, red, yellow, or the blue and greens, that would be accepted or, if not, within the prescribed tolerances to be corrected with the laminate overlays. For the purposes of this invention, and for the first time known to us, the flesh tones of actual living skin and flesh has been measured and used as standards of reflectance or comparison for the acceptable or expected balance of the flesh tone component colors.

The measured L, a, b values for human flesh tones in the area of the cheek and forearms of a selected number of males and females of white and black races have been carried out with the results summarized in Table 2. In this tabulation, the individual set of illustrative readings provide, for the first time a frame of reference for the expected reflectance (L), redness (+a value) and yellowness (+b value) along with a unique, additional monitoring ratio of the yellowness (+b value) over the redness (+a value) expressed as a quotient for ready reference in routine production control and reproducibility of processed prints. The overall observed range of the redness (+a value) with over 20 people ran from +4.0 to +10 for the actual individuals' cheeks and forearms, both interior light tone and the exterior darker tones. With a rated standard deviation of 0.2 scale units this range of redness values provides up to 30 levels of discrimination that can be detected or determined with actual, living flesh as a guide for the quality of the processed and corrected prints according to the procedures of this Table 2

Digital Color Difference (DCD) L,a,b Values for Living Flesh Colors
Subjects: Individual Cheeks and Forearms

| Person Code | Race (age) | Sex | Season | Measured on: | L | a | b | b/a* |
|---|---|---|---|---|---|---|---|---|
| Typical Individual Cases | | | | | | | | |
| | White (67) | Male | Winter | Forearm$^O$ | 52.5 | +6.2 | +13.8 | 2.26 |
| | | | | Forearm$^I$ | 56.5 | +7.2 | +17.1 | 2.38 |
| | | | Summer | Forearm$^O$ | 50.5 | +7.2 | +12.6 | 1.75 |
| | | | Winter | Cheek | 56.3 | +7.1 | +14.1 | 2.01 |
| WC | White (20) | Male | Winter | Forearm$^O$ | 55.2 | +7.1 | +13.2 | 1.86 |
| | | | | Forearm$^I$ | 56.8 | +8.0 | +14.2 | 1.78 |
| | | | Summer | Forearm$^O$ | 50.1 | +8.2 | +13.1 | 1.60 |
| | | | Winter | Cheek | 55.6 | +7.8 | +13.8 | 1.77 |
| SS | White (22) | Female | Winter | Forearm$^O$ | 59.9 | +4.2 | +15.6 | 3.71 |
| | | | | Forearm$^I$ | 60.1 | +4.8 | +15.8 | 3.29 |
| | | | Summer | Forearm$^O$ | 56.8 | +4.8 | +14.8 | 3.08 |
| | | | Winter | Cheek | 60.2 | +4.9 | +15.1 | 3.08 |
| JL | Black | Mal | Winter | Forearm$^O$ | 44.7 | +10.2 | +17.3 | 1.70 |

Table 2-continued
Digital Color Difference (DCD) L,a,b Values for Living Flesh Colors
Subjects: Individual Cheeks and Forearms

| CB | (36) Black (41) | Female | Winter | Forearm[0] | 48.2 | +9.4 | +17.1 | 1.82 |
|---|---|---|---|---|---|---|---|---|
| | Overall Range (20 subjects, both sexes and both races) | | | | | | | |
| | | | | Lowest values | 44.7 | +4.2 | +12.6 | 1.60 |
| | | | | Highest | 60.1 | +10.2 | +17.1 | 3.71 |

*Ratio of Yellowness (carotenoid) over Redness (hemoglobin)
[0]Outer side of the forearm
[I]Inner side of the forearm invention. In the case of the yellowness (+b value), the range for the same group was from 11.0 to 17.0 scale units; with the same 0.2 unit of standard of deviation, this implies about the same levels of discrimination that can be obtained by using instrumental readings. The range of the yellowness (+b value) over the redness (+a value) serving as an additional monitoring factor can expand these levels of discrimination further, can be also used as a simpler control over tolerable sub-ranges and can also be used to regulate the final print in terms of seasonal variations, as some people do acquire sun tans versus winter coloration. The yellowness over redness ratio in this case has been found to range from 1.60 to 3.71. On the low side of this range, i.e., below 1.60, this is an indication of excess redness, whereas on the high side, i.e., above 3.71, this indicates excess, unnatural yellowness or sallow appearance. The critical application of these L, a, b constants and the derived ratios will become evident in examples to be described in subsequent sections.

The primary means whereby these measured color characteristics, made on actual objects such as foliage (e.g. real green grass), flowers (real colors such as the pale or light purple of orchids), flesh or human skin colorations, and other natural objects, used as reference standards, can be corrected or adjusted on off-color print through the use of an overlying laminate serving three specific functions. Firstly, the laminating overlay for emplacing over the print to be corrected is a transparent base film in a thinness range down to 0.25 one-thousandths of an inch serving as a filter or the color additive or color subtractive component derived from organic polymers that have a high substantivity or dyeability to a wide range of organic dyes from the extreme reds to the extremes blues and in various gradations of color intensities of the primary and complementary spectral ranges. A variety of such thin polymeric films are commercially available. For the technical requirements of this invention, for the three specific functions involved, the second important function is adherence to, and retention of thin layers of adhesive formulations between the coloring film and the corrected print on its emulsion side. The third function is to provide carrier strength during the dyeing operation for developing the multitude of color filters, and the overlay onto the emulsion side of the print being color-corrected. Additionally, the laminating overlay film must serve as a protective, water-resistant and scratch-resistance covering to maintain durability, coupled with the inclusion of ultra-violet absorbers to prevent or decrease loss of color fidelity due to excessive actinic exposure.

The preferred overlay laminating films of this invention are derived from polymeric organic structures having an ester configuration that may be either internally within the linear chain of the polymer polyethylene terephthalate, or external to the linear polymer chain such as acetates of polyvinyl alcohol, cellulose, and the like, including their copolymer variants. These polyester structures have been bound uniquely suited by virtue of their high substantivity or affinity for a select class of dyes to be described and specificed in this disclosure. These structures provide the necessary, conbinative criteria of quality for the color-corrected prints that have been deficient in some color fidelity. These qualities include strength in thinness, i.e., less that of 2 one-thousandths of an inch, high substantivity to specific organic class of dyes described subsequently, strong adherencey to applied adhesives, and durability in terms of water-resistance and resistance to mechanical abrasion. The base overlay laminating films having the prescribed ester configurations in the polymer chain must have high tensile constant values, notably, modulus, ultimate strength and tear resistance, all these features requiring additionally a balanced, approximated mechanical constants in the planar directions of the film, that is lengthwise versus widthwise to within 20 percent variability which is usually achieved by orienting processes in the two normal directions of the film plane. For this requirement polyethylene terephthalate films, xuch as used for decorative panels and for magnetic tapes, represent one ideal for the purposes of the inventions and serves as a standard with respect to the mechanical and physical characteristics can be replicated with other polyester type of films. Another required feature of the laminating overlay film, in addition to the just described mechanical strength and dye substantivity, is the selection and use of adhesives having a high degree of tack and mobility to spread uniformly when applied as a component part of the palinating overlay. These two attributes serve to impose the color correcting laminating overlay on the surface of the printed color without disturbing or shifting the emulsion layer with its component color-imparting features.

The laminating overlay, as depicted in FIG. 1a, is emplaced over the color-processed print to be corrected having the conventional paper base (1) and the color-developed emulsion (2) so that the desired color-correcting laminate film (3) with its underlayer adhesive (4) contacts the emulsion layer (2), the two components pressed in the usual fashion to form an integrated compact, corrected, acceptable finished print. In cases where two or more color corrections with the laminating overlays are indicated from the a priori measurements with the L, a, b system, by color addition or intensification or by color substractive correction, the emplacement of the two or more overlays are depicted in FIG. 1b in which the second color correcting overlay film (5) with its layer of adhesive (6) is similarly applied and pressed into a compact, integrated finished print as is done with the single overlay laminate. The same laminated array is applied in the case of transparencies, as indicated in FIG. 1c, in which the substrate, instead of opague paper is a transparent film (7) with the print layer (8) usually an emulsion of the color print components from either convential silver sensitization or xerographic replication, over which the color correcting overlay 3, 4 or 5, 6 or its combination is applied.

Figure 2:
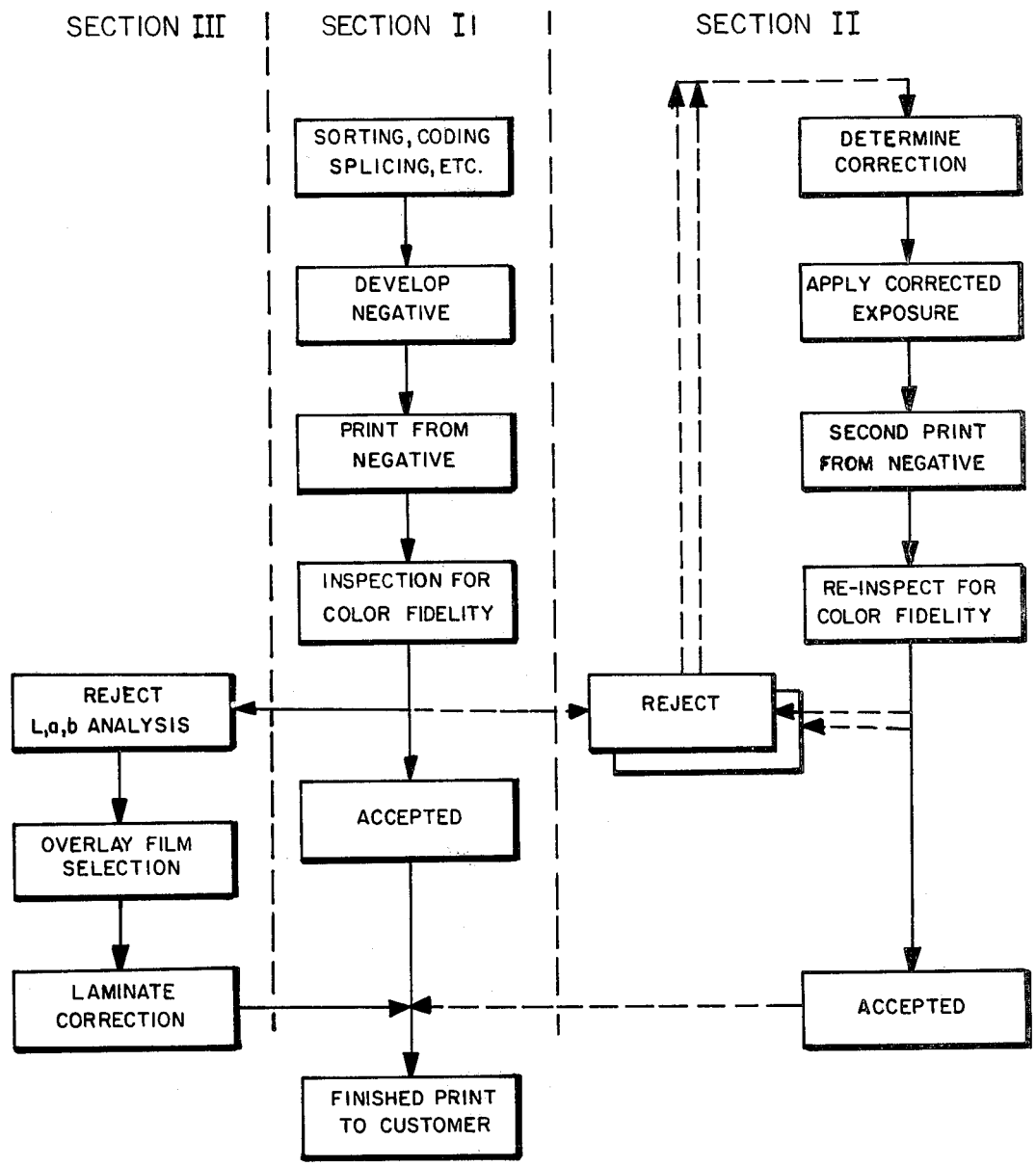
FIG. 2 shows the various method steps involved in preparing a finished color print having a desired color correcting overlay secured thereto.

Having described the essential, technological features, it is next important to the understanding of this invention to indicate the manner in which the ultimate product, namely, the color-corrected print from photographs, is applied in actual practice for production systems whereby photographic negatives are processed into marketable prints. FIG. 2 depicts by diagram the usual operating sections (I and II) in the typical color processing, mostly in automatic systems processing hundreds of prints, of exposed negative film on receipt from customers, both professional and amateur. Section I depicts the normal process wherein the completed final print comes out as an acceptable, reasonably faithful rendition of the colors involved, such as sky, landscape, fruits with realistic color, portraits and the like. Frequently, because of numerous variations in initial exposures to produce the negative, such as (a) improper lighting conditions sometimes by virtue of daytime differences, (b) depletion of certain processing chemicals or their imbalance, (c) changes in make up of water ionic strength, and many other factors, the desired print in Section I comes out with off-color printing. This renders the print, as the positive, unacceptable for what the original photograph was intended or what the customer desired. The print, therefore, becomes a reject and has to be further processed as a remake for the salvageable value of the original negative. A remake, as indicated in Section II, in such a case is costly on several counts.

Firstly, there is the loss of chemicals, notably silver and the color developing ingredients, thereby imposing a cost factor that ultimately goes to the consumer, as well as delay for customer service. Remakes in the U.S.A. alone because of the rejection range from 5 to 10 percent of total photographic paper involves millions of square feet of expensive photographic paper with thousands of ounces of silver, a not insignificant economic loss of a valuable commodity.

Secondly, the repeated remake operation into a second and often a third remake printing has to be removed, separated from the efficient automatic process and placed into a less efficient manual operating line that requires skill and time of experts upon whom the choice of color-correction depends, usually on personal, often biased, human adjustment. This supplemental manual color-correcting operation, being one of visual decision, is required for good commercial service, the expenses of which affect profitability, since many photographs are obviously not repeatable and the negative is the sole record of some fleeting event or condition.

Thirdly, the remake operation frequently entails several hours delay for the necessary definitive evaluation of the reject with regard to needed color-correction by trial-and-error filters so as to determine the re-exposure for substractive processing. This is relegated to a back log of remake printings thereby delaying the delivery of the final, acceptable print for several days to a week or more. Thus, the need for a simpler salvaging process becomes clearly evident.

For these technical and economic reasons, the application of this invention and the need for the products and processes of this invention becomes highly significant by virtue of the restorative features, depicted in Section III, of FIG. 2. This Section III involves, as explained previously, the emplacement of color-correcting laminate overlay described heretofore determined by a simple, non-subjective L, a, b color analysis. This involves comparing the color values of selected, key areas of the remake to reference standards in real life of the "a" and "b" values, along with their control a/b and b/a ratios quotients from which the necessary additive and/or substractive overlay or overlays are determined and then promptly applied to attain the corrected color features.

The principal feature of this innovative operating Section III is the utilizing of thin transparent, organic, polymeric films of which there are many types in industrial, commercial applications, such as polyesters with both intralinear functional components in the macromolecular chain. One such prominent polyester of the intralinear type is polyethylene terephthalate, available under the trademark MYLAR from E. I. du Pont de Nemours and Co., Inc., in commercial thickness grades ranging from 0.00025 inch, commonly referred to as one-quarter mil, to 0.002 inch or more, commonly referred to as 2 mil film. In a typical procedure for developing colored, dyed overlay films, MYLAR Type S polyethylene terphthalate, one-thousandth of an inch thick (1 mil) is prepared for dyeing in a one (1) percent MERPENTINE detergent aqueous solution at 60° C. for a period of 1 to 3 minutes. The film is then rinsed with clear tap water at a temperature of 60° C. A dye bath is prepared using a formulation containing 0.25% of the water dispersed selected dye, with 7.5% of a surface active agent, 2.5% denatured alcohol and 90water. The MYLAR film is immersed in the dye bath for periods from 3 seconds to 1,000 seconds depending upon intensity of color desired. The film is then immediately removed from the dye bath, rinsed in clear tap water at (60° C.) and 140° F. and dried by appropriate means. In this formulation, the water dispersed dyes are available from E. I. du Pont Co. under the registered trade name of LATYL disperse dyes formulated with 2 parts ALKANOL XC (du Pont Co.), 2 to 3 parts pine oil available from various commercial sources, and 3–4 parts water. Following this dyeing operation, the dyed film is next coated on one surface with a thin, thermoplastic adhesive and subsequently applied as a color correcting laminating overlay over the deficient color print with the adhesive coated sides always interfaced toward the prints.

The intensity of color imparted to the plastic film is a function of dye concentration which is usually maintained between 0.25% and 0.50% or by varying the total immersion time, in a range of several orders of magnitude, in the dye solution. Both methods are substantially equivalent with some preference for the latter, time variant procedure in a constant dye strength or concentration.

EXAMPLE I

This Example provides the details in preparing a range of color intensities for the dyeing process using a series of typical anthraquinone and other aromatic dyes, such as are listed in the text, Colour Index, published by the American Association of Chemists and Colorists. From this listing, specific chemical types of dye colors substantive to organic substrates having either acidic, basic, ester, amide, and other binding affinity can be selected to impart the desired color chroma, hue, or value to the polymeric film base, such as the MYLAR polyester film referred to previously. In this Example, a series of spectral colors in the nominal primary and complementary range are prepared using the commercial process designated as the LATYL process mentioned previously, applying a fixed series of time exposures in the dye tank (26) ranging from 10 to 3000 seconds exposure in the dyeing solution. The resulting dye color intensities from this range of dye bath exposure times are measured in the Digital Color Difference spectrometer for the L, a, b readings on the finished dye operation, which readings are used to make a standard range of intensities for use as overlay laminates to be applied for the color corrections or adjustments for the rejects or remakes described in FIG. 2, Section II, for processing according to Section III in FIG. 2. The L, a, b readings for a typical series of spectral LATYL dyeing, singly and in combinations are listed in Tables 3a and 3b, obtained by the process depicted in FIG. 3. The measurements were made against a standard white tile background having an "L" value of 94.4 percent, and "a" value of −1.2, and a "b" value of +2.0, over which the series of dyed polyester films were emplaced and measured for the corresponding, L, a, b values.

The data in Tables 3a and 3b provide a working example of an extensive series of LATYL dyes of various color designations for the principal additive and subtractive primary colors, respectively, from which various levels of monochromicity can be attained for the corrective overlays, such monchromciity being evident by the ratios of the "a" and "b" values indicated for the four measured spectral colors utilized in this invention, namely, red, yellow, green and blue and their components. In the case of the overlays with the primary additive colors, shown in Table 3a, of particular merit is the novel means of using mixtures of organic dyes in such a manner as to enhance, for instance, a given ratio of any two additive colors. For instance, the nominal blue dye color overlay can be produced for high degree of blue chromicity by replacing LATYL Blue 4R with LATYL violet whose blue/green ratios are appreciabley higher. Other mixtures of primary additive dyes with even primary substractive dyes can be devised to gain even substantially higher ratios with other variations of the four principal colors, calculatable from selected combinations of dyed film substrates. In the case of the subtractive primary colors, summarized in Table 3b, the dye time in the bath has an important effect not only on the intensity of the monochromicity values but also on the dominant monochromicity ratio which has been found to change with increasing dye time. For instance, the cyan values with LATYL Brillian Blue BGA changes from a dominant green (−a) over yellow (+b) ratio to a dominant green (−a) over the blue (−b) ratio between the 33 and 67 immersion time, suggesting a unique initial molecular binding of the LATYL dye to the polyester overlay film. In the case of the magenta series using LATYL Bordeaux B, a pronounced inversion or shift occurs similarly between 33 and 67 seconds from the initial high blue over red monochromicity to a dominant red over blue. Thus, this Example illustrates the surprising and unexpected feature of moderating an absorptive chromophoric dye producint varying levels of dominance and inversion of both the additive and subtractive primary colors that can be incorporated into the corrective overlay films.

Table 3a.

Digital Color Difference (DCD) L, a, b Values
Dyes: Additive Primary (LATYL Series)
Overlay film: Polyethylene terephthalate (MYLAR)
- 0.25 mil thick by 12 inch wide.

| Color Designation (Nominal) | LATYL Grade | Dye time (sec.) | DCD Values | | | Principal (Dominant) Color Ratio | |
|---|---|---|---|---|---|---|---|
| | | | L | a | b | | |
| Red STD | Brick Red FV | 10 | 84.4 | +4.3 | +4.2 | Red/Yellow | 1.02 |
| | | 33 | 82.5 | +7.3 | +4.6 | | 1.59 |
| | | 67 | 79.7 | +11.4 | +5.6 | | 2.04 |
| | | 100 | 79.7 | +11.5 | +5.8= | | 1.98 |
| Red ALT | Bordeaux B (16) | 10 | 83.1 | +3.3 | +4.2 | Red/Yellow | 0.79 |
| | Cerise NSN (29) | 33 | 80.6 | +5.7 | +5.4 | | 1.06 |
| | Yellow 3G (19) | 67 | 73.5 | +13.1 | +10.0 | | 1.31 |
| | * | 100 | 59.6 | +29.9 | +17.2 | | 1.74 |
| Green | Yellow GFSW (45) | 10 | 87.3 | −4.3 | +5.6 | Green/Yellow | 0.77 |
| | Brilliant Blue (25) | 33 | 86.9 | −5.7 | +7.1 | | 0.80 |
| | * | 67 | 86.5 | −6.7 | +7.7 | | 0.87 |
| | | 100 | 85.8 | −7.7 | +8.6 | | 0.89 |
| | | 300 | 85.0 | −15.8 | +11.4 | | 0.77 |
| Blue STD | Violet BN | 10 | 81.0 | −0.0 | −4.7 | Blue/Green | — |
| | | 33 | 75.0 | +1.3 | −11.6 | | 8.92 |
| | | 67 | 69.8 | +2.7 | −17.9 | | 6.63 |
| | | 100 | 67.8 | +3.7 | −21.6 | | 5.84 |
| Blue ALT | Blue 4R | 10 | 83.4 | −1.9 | −1.8 | Blue/Green | 0.95 |
| | | 33 | 80.3 | −2.1 | −5.0 | | 2.38 |
| | | 67 | 79.0 | −2.1 | −6.3 | | 3.00 |
| | | 100 | 78.1 | −2.1 | −7.1 | | 3.38 |

*Mixtures in proportions indicated in parentheses

Table 3b.

Digital Color Difference (DCD) L, a, b Values
Dyes: Sutractive Primary (LATYL series)
Overlay film: Polyethylene terephthalate (MYLAR)
0.25 mil thick by 12 inch wide

| Color Designation (Nominal) | LATYL grade | Dye Time (sec.) | DCD Values L | a | b | Principal (Dominant Color Ratios) | |
|---|---|---|---|---|---|---|---|
| Cyan | Brilliant Blue | 10 | 86.9 | −3.2 | +1.1 | Green/Yellow | 2.9 |
| | BGA | 33 | 86.1 | −3.9 | +0.3 | Green/Yellow | 10.3 |
| | | 67 | 85.5 | −4.6 | −0.2 | Green/Blue | 23.0 |
| | | 100 300 | 85.6 | −4.4 | −0.2 | Green/Blue | 23.0 |
| Megenta | Bordeaux B | 10 | 85.2 | +1.1 | −16.2 | Blue/Red | 14.7 |
| | | 33 | 83.2 | +3.1 | −10.4 | Blue/Red | 3.4 |
| | | 67 | 74.9 | +10.9 | −2.1 | Red/Blue | 5.2 |
| | | 100 300 | 69.9 | +16.4 | −0.0 | Red/Blue | 16 |
| Yellow | Yellow 3G | 10 | 88.2 | −7.3 | +14.2 | Yellow/Green | 1.93 |
| | | 33 | 88.0 | −8.8 | +20.5 | Yellow/Green | 2.33 |
| | | 67 | 87.9 | −9.7 | +22.7 | Yellow/Green | 2.34 |
| | | 100 | 87.9 | −10.1 | +23.6 | Yellow/Green | 2.34 |
| | | 300 | 86.8 | −11.3 | +26.5 | Yellow/Green | 2.35 |

The dyed overlay polymeric films, produced by the technical details and color monitoring as described in the Example I, is next ready for the application of the adhesive layer to just one side of the film for the permanent bonding of the color-correcting overlay onto the remake print in the case of a single color correction or in multiple layers, one on top of the other, in cases where two or more color corrections are necessary. In the trade a variety of adhesives and adhesive-coating processing systems and machines are available. Typical adhesives applied either from solutions or from melts are available in numerous chemical types and formulations. For the purpose of this invention, the principal ingredients comprise strong tackifying polymeric materials such as polyisobutylene with additives serving to make the application of extremely thin coatings of the adhesive onto the dyed overlay polymeric film. Polyisobutylene is used in the case of this Example I by either solvent application at ambient temperatures or by melt application in which the viscosity of the polyisobutylene is reduced at the melt process with appropriate amounts of compatible microwaxes specified by the manufacturer of the principal polyisobutylene component. A common trade name for polyisobutylene is VISTANEX, an industrial product of Exxon Chemical Company, Elastomer Department, with a variety of molecular weight grades.

With the completion of the application of the adhesive stocks of the adhesive coated, dyed polymeric films are made available for each of the three additive primary and three subtractive primary colors with a range of at least three intensities for each of the colors as measured and appropriately specified from the L, a, b values such as described in Example I with the pertinent, exemplary values in Tables 3a and 3b. The stock of six additive and subtractive colors with the desired range of intensities are readily established from the at hand experience with remakes so that substantially all of the color deficient remakes can be processed with appropriate laminating color overlay or overlays. The extent to which the single or multiple corrections need to be applied is efficiently carried by correlating measured L, a, b values on the remake print to a computerized, reference color system that would call for the laminate correction to within few percent of the expected high fidelity of finished print such as initially depicted in FIG. 1 with its component variations.

Figure 3:
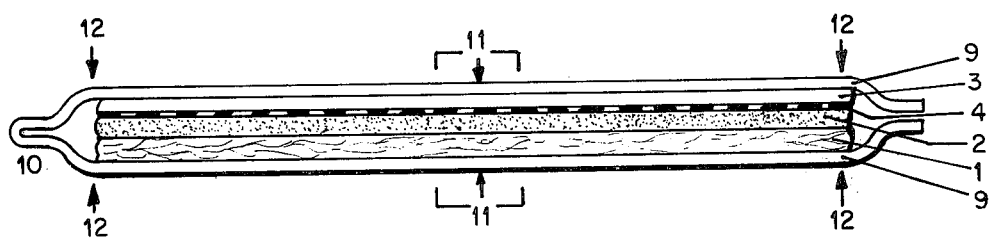
FIG. 3 shows a color print of the type shown in FIG. 1A encased in an envelope of polymeric film.
Figure 4:
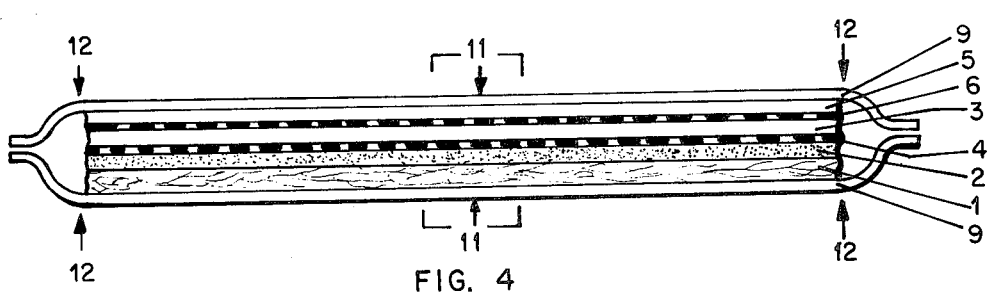

The actual assembling of the final, color-corrected prints, shown in FIG. 1a, is accomplished by pressure lamination, depicted in FIG. 3, wherein the remake (1,2) is provided with the color-correcting overlay polymeric film (3) with its underside next to the remake having the appropriate pressure-sensitive adhesive (4) and emplaced between two surfaces of a heat resistant, non-adhering polymeric film (9) serving as an enclosure which can be applied as fold at point (10) or as an envelope having a thickness of 0.005 to 0.020 inch. Such enclosure films are made from high performance polytetrafluoroethylene, polyimides, etc., films. These assemblies are placed in ordinary presses provided with matching, upper and lower, form, sometimes termed chase, that closely approximate the external dimensions, with appropriate tolerances of the print, and provide indentations at the edges and corners of the enclosed assembly (11, 12). For multiple color-corrected prints, shown in FIG. 1b, a similar assembly is done, as shown in FIG. 4, with two color-correcting polymer film overlays, that are emplaced in press for single manual or automatic pressing with an applied force and temperature at specified holding times as is done in usual commercial practices. Instead of straight-line one-time pressing, the assemblies can be introduced into roll presses that are regulated for pressure and temperatures at specified pressing rates. With these procedural details at hand teaching the manner and means whereby the color color correcting laminate polymers are applied to the color deficient base reproduction, the ensuing Examples now provide the descriptive details for attaining the high color fidelity for acceptable for photographing and other imaging reproductions.

EXAMPLE II

A unique feature of this invention employing the wide range of color correcting and balancing laminating overlay films made available by the process described in this Application is the attainment of acceptable high fidelity reproduction of the natural colors from the color deficient remake as illustrated by the ensuing descriptive details. A professional color photograph of an elderly male as a nearly full front portrait with facial dimension approximately one-fourth size was processed on a 14-inch by 17-inch print in the conventional manner but producing an markedly off-color with a pronounced green hue thereby rejected as an marketable product (Print A). A quick read-out on the digital color difference meter indicated, as shown in Table 4, an instrumental reading of minus "a" (−a) to the level of −5.5 units which indicated the need for the addition of a magenta laminate to absorb the green coupled with an added red laminate to reinforce the required redness for replicating the flesh tones. A second print (B) would be made according to the conventional process indicated in Section II, FIG. 2, involving the forming of a new negative using a green-cancelling proprietary magenta filter selected visually, and not instrumentally, with a supplementary red intensifying filter; in the conventional photographic process, the first greenish, or overly green Print (A) is discarded as a reject, thereby imposing an additional cost and delay in print finishing operations.

In lieu of making the second Print (B), a correction of the already processed Print A is undertaken employing a sequence of selected color overlays correlated to the above quick read-out as described sequentially in Table 4. A single magenta polyethylene terephthalate dyed overlay on Print A produces Print B which neutralizes the excessive green color ($-a$) but decreases markedly the yellow ($+b$) color. Next a red polyethylene terephthalate dyed overlay on Print A produces Print D with an acceptable flesh color tone with a yellow-overred ratio ($+b/+a$) somewhat higher (1.75) than that of the second processed Print B (1.13). Still another laminate correction using a combination of the magenta and the red polyethylene terephthalate laminates applied in Prints C and D, respectively, resulted in Print E which more nearly approximated the coloration of Print B. For multiple copies in production to provide the acceptable Print E, the lamination is carried out according to the arrangement depicted in FIG. 3 with the assembly of the integral components. Thus from the series indicated in Table 4, it is evident that an extended series of magenta, red, and other color overlays of graded intensities can be maintained in stock from which even finer or closer approximation to the desired portrait flesh tones of the particular subject can be achieved. In this case, the flesh color tones expressed or correlated to the yellow-over-red ($+b/+a$) ratio within the range indicated in the tabulation can hardly be distinguished or differentiated visually. Only the precision and instrumental readings from a standard read-out system like that of the Hunterlab D25A2 can disclose the subtle differences between the values 1.13 and 1.75.

EXAMPLE III

Another example of the unique and simple feature of this invention is the attainment of acceptable high fidelity, natural appearing color reproduction of portraits of children, especially against backgrounds that have to have true or nearly true colors which often may wash into the facial features of the subject such as by light reflections from clothing, wall, and so on. An 8-inch by 10-inch color portrait of a young boy with a facial feature area on the print of approximately 2 inches was processed in the conventional manner. The resulting print gave an excessively blue-green coloration of the facial features instead of the usually yellow-red tones, such as indicated in Table 2, thereby rendering the print rejectable with a commercial value of 10 to 20 dollars. As indicated in Table 5, the Digital Color Difference spectrometer confirmed the un-natural color balance of the first Print A with a strong blue ($-b$) reading of $-5.7$ with which the yellow-over-red ($+b/+a$) cannot be defined. From the ready stock of wide range of color correcting polymeric films, and by applying a pre-determined calculated nomograph, two laminates were applied sequentially, one to increase the yellowness as indicated by Print B and the second magenta laminate to impose an increase of the redness value forming Print C. From the tabulation, it is evident that the digitalized color difference instrumental readings for the yellow-over-red ration (1.93) brings the color rendition within the range (E) shown in the listing for young children. Another laminate dyed with yellow and magenta LATYL dyes provided another alternate for a single lamination prepared as a stock exclusively for this type of portrait series was imposed to produce Print D giving substantially the same, acceptable yellow-over-red ($+b/+a$) ratio. The instrumental monitoring for the reflectance units is especially useful even for adjusting the level of total reflectance (L) in the first printing. For multiple copies the lamination with the selected overlay is carried out according to the heat lamination depicted in FIG. 4.

Table 4.

Laminate Color Correction
Subject: Portrait - total facial feature
(2-inch diameter digital scan)

| Print | Digital Color Difference Reading* | | | | Remarks |
|---|---|---|---|---|---|
| | Reflectance L | (+) Red (−) Green a | + Yellow − Blue b | Yellow/Red Ratio** +b/−a | |
| (A) Reject | 35.6 | −5.5 | +11.3 | n/a | Excessively green |
| (B) Second Reprint | 32.7 | +7.1 | +8.0 | 1.13 | Acceptable |
| Laminate Color Correction on Reject (A) | | | | | |
| (C) Magenta 100 | 31.8 | +3.2 | +1.7 | 0.53 | Too red, inadequate |
| (D) Red 300 | 30.2 | +5.6 | +9.8 | 1.75 | Acceptable |
| (E) Magenta 100 + Red 300 | 29.8 | +6.5 | +8.8 | 1.35 | Acceptable |

*Hunter Digital Color Difference Meter D25D2A
 Calculated only when both yellow and red are indicated; (n/a) not applicable when green (−a) and blue (−b) are indicated.

Table 5

Laminate Color Correction
Subject: Portrait - total facial feature
(2-Inch diameter digital scan)

Digital Color Difference Reading*

Table 5-continued

Laminate Color Correction
Subject: Portrait - total facial feature
(2-Inch diameter digital scan)

| Print | Reflectance L | (+) Red (−) Green a | + Yellow (−) Blue b | Yellow/Red Ratio** +b/−a | Remarks |
|---|---|---|---|---|---|
| (A) Reject | 52.1 | +6.6 | −5.7 | n/a | Excessively blue |
| Laminate Color Correction | | | | | |
| (B) Yellow 300 | 47.5 | −3.3 | +11.0 | n/a | Greenness evident |
| (C) Yellow 300 + Magenta 300 | 39.2 | +5.4 | +10.4 | 1.93 | Acceptable color fidelity |
| (D) Yellow-Magenta 300 | 43.4 | +5.8 | +11.8 | 2.03 | Acceptable like (C) |
| (E) Goal range | | | | | |
| High | 58 | +10 | 17 | 1.70 | Reference standard |
| Low | 38 | +4 | 11 | 2.75 | |

*Hunter Digital Color Difference Meter D25D2A
**Calculated only when both yellow and red are indicated; (n/a) not applicable when green (−a) and blue (−b) are indicated.

EXAMPLE IV

Another example of the application of this invention relates to color corrections of photographed or otherwise imaged landscape scenes in cases frequently the color fidelity and color balance may be lacking or provided with an excess of some one or two chroma such as the blueness of the sky or the redness of the late afternoon sun. Additionally, the lack of the esthetic color balance may also be due the inadvertent effects of sunlight, sky, and atmospheric dispersions or mist, as often happens, or to the inadvertent variations or errors in the printing dyes, developing and printing colors, and numerous other ingredients involved in the processing operations, in the development of negatives, or their reversal, or in the printing system. Scenic photographs are used extensively in imaging devices and systems, in advertising, in commercial displays and exhibits, and so on, using the scenic background to feature some article of display. Such scenic photographs in the form of reflected and transmitted imaging often require color reproduction on transparencies through which artificial or natural light is imposed often with color errors. Such transparencies and their print counterparts need to be accorded either high degree of fidelity or built in adjustments because of the un-natural rendition of the feature scene, such as trees in forests, lakes, seashore, and so on. The most prominent problem in this form of commercial or display photography or illumination is the excessive blueness, to cite one example, that ofter results from the overall developing operations to produce the transparency, thus requiring an expensive and time-consuming remake operation as depicted in FIG. 2, Section II.

In this example and 8-inch by 10-inch photograph of a lake with a background and foreground of trees following conventional processing was found to be visually unacceptable because of excessive blueness and was therefore monitored for an analytical determination of the color excesses and color deficiencies by means of the Digital Color Difference system for correlation to color adjusting overlay color intensities using a multiple indexing nomographic analyzer from the proper color and its intensity is derived. A quick read-out indicated that an overlay laminate yellow from one of the scale of the eight graded intensities would provide the needed correction. The DCD data in Table 6 summarizes the resulting correction on the reject Print A leading to the acceptable Print B. The digitalized information indicate that the trees in the forest have the as expected prominence in the green (−a) value along with the prominent yellow (+b) value, as would be expected from the natural coloraof chlorphyll and xanthines which have already been instrumentally registered just as has been done with flesh tones, shown in Table 2 with actual and direct measurements, and with grass clippings, shown in Table 1 also with actual and direct measurements. The lake which one would expect to provide some green chromicity showed appreciable blueness with the indicated (−5.1) "b" value, which needs to be elimated and to be replaced in part by some level of yellow (+b) deficiency so as to reflect some of the forest greenness on the lake reflected from the adjacent forest. By applying the yellow overlay laminate, from LATYL Yellow 3G, the blueness is eliminated and a reasonably prominent yellow (+9.5) value is obtained just below, and properly so, that of the trees in the adjacent area that would be expected to reflected into the lake, giving the acceptable print or transparency (B). Other color hues and nuances can be similarly attained depending upon that favored for the display or imaging system. The finished print or transparency is processed for the lamination as indicated in FIG. 3 and in FIG. 4.

Table 6

Laminate Color Correction on Remake Print
Subject: Lake and forest scene
(2-inch DCD scan)

| (print) Feature of scene | Digital Color Difference Values | | | Visual color assessment of fidelity |
|---|---|---|---|---|
| | Reflectance L | (+) Red (−) Green a | (+) Yellow (−) Blue b | |
| (A) Remake because of excessive blue | | | | |
| Trees in forest | 27.9 | −8.5 | +11.4 | Natural green for reference |
| Lake in foreground | 65.7 | −11.9 | −5.1 | Unacceptable - excessive blue |
| (B) Applied Overlay Laminate Yellow 100 * | | | | |
| Lake in foreground | 59.4 | −19.2 | +9.5 | Acceptable |

* Selected from nomograph index

In the concept of this invention, what is presented is a product in the form of a photographic replication in which the natural or normal color appearance of the photographed object is replicated with high fidelity of specific colors in a finished print by a process of adjusting excessive or deficient coloration by means of superimposed corrective overlays bonded to become an integral part of the finished print. In this invention, the prints with their corrective overlays are mutually dependent upon the involvement of a reference or standard color comparator with existing objects, inanimate, scenic and animate living, whose spectral values are predetermined by a digital color difference system serving to monitor the print quality with measured digital color values which, in turn, direct the selection of dyed overlay laminates with quantitized corrective both additive and substractive colors. These two digital color monitoring features, in turn, regulate the process factors that are made practical by a laminating process whereby the deficient print, now provided with color correction, becomes an integral part of the finished print. The Examples described herein more than amply illustrates the overall concept and have indicated only a limited number of the principal component features, especially for the thin film used for the overlay, for the absorptive dyes for an extended range of color correction and for the adhesives used for which there are numerous modifications and equivalents that come within the scope of this invention.

As a primary structural component of this invention, the polyester chemical configuration has been used as representative example with special attributes for absorption of a variety of commercially available dyes to controlled spectral intensities quantitized by a digital color difference system. As mentioned previously, both, (a) the intralinear ester configuration in which the carbonyl —C(:O)O— linkage is made integrally into the polymer chain and (b) the extralinear ester configuration in which the —C(:O)O— is made pendant or hanging on, so to speak, to the polymer chain, include the carbonyl configuration which has been found to be particularly effective in producing an extended range of selected color intensities. With dye-to-film absorption time intervals of 10 to 3000 seconds, the carbonyl configuration in these polymers allows incremental range of 6 or more grades of intensities within 1 to 2 percent deviation from reference DCD comparator standards, herein described. Typical examples of the intralinear polyesters are those derived from glycols and dicarboxylic organic acids, notable ones being ethylene glycol and terephthalic acid, respectively, from which polyethylene terephthalates are produced by condensation polymerization. Available commercially are numerous modifications in which other glycols with polyhydric alcohol modifiers and analogs and homologs of terephthalate acid are used. Typical examples of extralinear polyesters are the cellulose esters in which the pendant acetyl and related homologs provide the external ester configurations, principal examples being cellulose acetates, propionates and the like. Commercial variations of cellulose esters provide a wide range of dye absorption rates for which incremental spectral color intensities can be controlled to permissible deviations from expected DCD reference comparator standards used in this invention. Other extralinear carbonyl configurations are obtainable from copolymers of acrylic esters with olefins, maleic anhydride with olefins and the like, to serve as dyeable, overlay film bases. The preference or choice for any of these chemical configurations is primarily based on physical and mechanical adaptability, such as initial film transparency in the one instance and the strength requirements for a tough durable overlay in the other. In addition, the balance of the mechanical properties, notable stiffness versus flexibility, is a criteria of the suitability of appropriate modifications and equivalents, especially for the dyeing operation such as would be commercially carried out in film coating processes. In addition to stiffness versus flexibility characteristics, the tensile strength and tear sensitivity of the selected organic polymer structure is important. These features are usually adjusted by primary molecular forms, such as chain tacticity, chain orientation and directional balance and degree of crystallinity and crystalline symmetry. These latter primary features determine the extend to which workable thickness range can be chosen for the overlays with the lowest possible thickness usually running generally from 0.002 down to 0.0001 inch. Lastly, and not the least, are the variations in esthetic surface features of the uppermost overlay ranging in finish from glossy to matte and other textured forms of varying impressed surface modifications to which this application is particularly applicable and useful.

An integral part of this invention is the selection and application of the adhesives most suited to accomplish the effective and permanent bonding of the dyed polymeric film overlay to the photographic or appropriately imaged print and most suited for the finished article as depicted in FIGS. 1,2,3 and 4. Among the principal physical property requirements for the nature of the adhesives and their formulation for this invention is that they must be mobile with a range of viscosity compatible with the operating conditions for coating thin layers of adhesive. Next, the chemical requirements include (a) hydrophobic or water-nonreactive nature to preclude any water absorption or hydration of any member of the finished multilaminar print, (b) inertness to the dyes selected for the principal colors used in color correction of the remake print, (c) oxidative resistance that would preclude embrittlement and/or discoloration and (d) stabilizers against actinic degradation or discoloration. These and other related and inferred requirements are adequately and most specifically met by the basic polymeric configuration having a strong inherent quality of tackiness commonly attributable to branched chain hydrocarbon gums and elastomers derived from polyisobutylene either as an exclusive or as a partially recurring component of the polymeric chain or with structural organic analogs and homologs having one or more carbon structures similar in some segment of the molecular chain to that of the isobutylene polymerized segment. The parent structural component on which this requirement is based is that of the wide range of polyisobutylene grades ranging in weight average molecular weights from 1,000 to 40,000 more or less. Numerous copolymers of the principal isobutylene monomer with other monomers, such as that of ethylene, propylene, butylene, methyl and other alkyl acrylates, vinyl chloride, isoprene, chloroprene, and others can be used effectively for the laminate bonding. The principal criterion of the workable molecular weights in thee copolymer compositions is that they be applied in a viscosity range of 10 to 300 centipoises at the adhesive application stage of the coating process. These and other analogs having the unique tertiary carbon like that of isobutylene with equivalent viscosity and inherent tackiness are considered to be within the operable features of this application and the quality of the finished, laminated color corrected prints.

What is claimed is:

1. A high fidelity color corrected and adjusted print comprising a base reproduction initially deficient or rendered excessive in one or more measured spectral colors, as compared to their measured natural color rendition, with one or more overlays of laminated adherent dyed polymeric films serving to provide the color correction and adjustment with selected intensities of additive and subtractive primary colors.

2. A high fidelity color corrected and adjusted print comprising a base printed reproduction initially deficient or rendered excessive in one or more measured spectral colors as compared to their measured natural color rendition, said reproduction obtained by photographic process with one or more overlays of thin laminated adherent dyed polymeric films derived from polyester configuration in which are incorporated the adjusting spectral deficiences or excesses of the primary colors involved therein.

3. A high fidelity color corrected and adjusted print comprising a base printed reproduction initially deficient or rendered excessive in one or more of the red, yellow, green, and blue intensities, as compared to the prominance of these colors in natural state of reflectance, with one or more overlays of laminated adherent dyed polymeric films serving to compensate for the color deficiencies or excesses by addition or subtraction.

4. A method for the product of claim 3 whereby the color deficiencies or excesses are determined by digital color difference measurements made on the natural or original source from which the printed reproduction is made with the said measurements applied to the base reproduction for selecting and estimating the specific additive or subtractive colors and their intensities from a graded series of dyed polymeric film overlays.

* * * * *